United States Patent
Heinhold et al.

(10) Patent No.: US 7,503,687 B2
(45) Date of Patent: Mar. 17, 2009

(54) MACHINE FOR MIXING A FROZEN DESSERT

(75) Inventors: Duane H. Heinhold, Bountiful, UT (US); Kenneth E. Heinhold, Salt Lake City, UT (US); Don H. Savage, Salt Lake City, UT (US)

(73) Assignee: Swirl Freeze Corporation, Salt Lake City, UT (US)

( * ) Notice: Subject to any disclaimer, the term of this patent is extended or adjusted under 35 U.S.C. 154(b) by 358 days.

(21) Appl. No.: 11/116,914

(22) Filed: Apr. 27, 2005

(65) Prior Publication Data

US 2005/0249032 A1  Nov. 10, 2005

Related U.S. Application Data

(60) Provisional application No. 60/568,757, filed on May 5, 2004.

(51) Int. Cl.
*B01F 7/16* (2006.01)
*B01F 7/24* (2006.01)
*B01F 15/00* (2006.01)

(52) U.S. Cl. .................. 366/197; 366/199; 366/203; 366/256; 366/347

(58) Field of Classification Search .............. 366/347, 366/197, 199, 203, 289, 260, 259, 258, 256, 366/255
See application file for complete search history.

(56) References Cited

U.S. PATENT DOCUMENTS

| | | | | |
|---|---|---|---|---|
| 2,584,437 | A * | 2/1952 | Douglass | 366/197 |
| 2,626,132 | A * | 1/1953 | Reed | 241/282.1 |
| 2,626,133 | A * | 1/1953 | Reed | 366/206 |
| 3,061,279 | A * | 10/1962 | Reed | 222/413 |
| 3,323,320 | A * | 6/1967 | Conz | 62/303 |
| 3,352,543 | A * | 11/1967 | Niederman et al. | 366/286 |
| 4,448,114 | A * | 5/1984 | Mayer | 99/494 |
| 4,502,377 | A * | 3/1985 | Hall, Jr. | 99/492 |
| 4,506,988 | A * | 3/1985 | Reed | 366/203 |
| 4,548,054 | A * | 10/1985 | Levine | 62/342 |
| 4,548,508 | A * | 10/1985 | Verkler | 366/195 |
| 4,590,851 | A * | 5/1986 | Mayer | 99/455 |
| 4,590,852 | A * | 5/1986 | Mayer et al. | 99/455 |
| 4,637,221 | A * | 1/1987 | Levine | 62/342 |
| 4,647,214 | A * | 3/1987 | Kibby | 366/212 |
| 4,671,172 | A * | 6/1987 | Stiglich | 99/460 |
| 4,693,611 | A * | 9/1987 | Verkler | 366/195 |
| 4,702,608 | A * | 10/1987 | Garbar et al. | 366/146 |

(Continued)

*Primary Examiner*—Tony G Soohoo
(74) *Attorney, Agent, or Firm*—Thorpe North & Western LLP

(57) ABSTRACT

A frozen dessert mixing machine of the type including an auger and mixing cone which has an open top, wherein the mixing cone moves toward the auger and the auger mixes a frozen desert from material contained in the mixing cone. The mixing machine further comprises means for effectively closing the open top of the mixing cone during the mixing of the desert material so that a liquid material can be included in the mixing cone to be mixed with a frozen material in the mixing cone without the liquid material or resulting mixture being ejected from or otherwise escaping from the mixing cone. A valve mechanism is associated with an opening in the bottom of the mixing cone so that the resulting mixture in the mixing cone can be dispensed from the bottom of the mixing cone when the valve mechanism is opened.

14 Claims, 3 Drawing Sheets

U.S. PATENT DOCUMENTS

Figure 1:
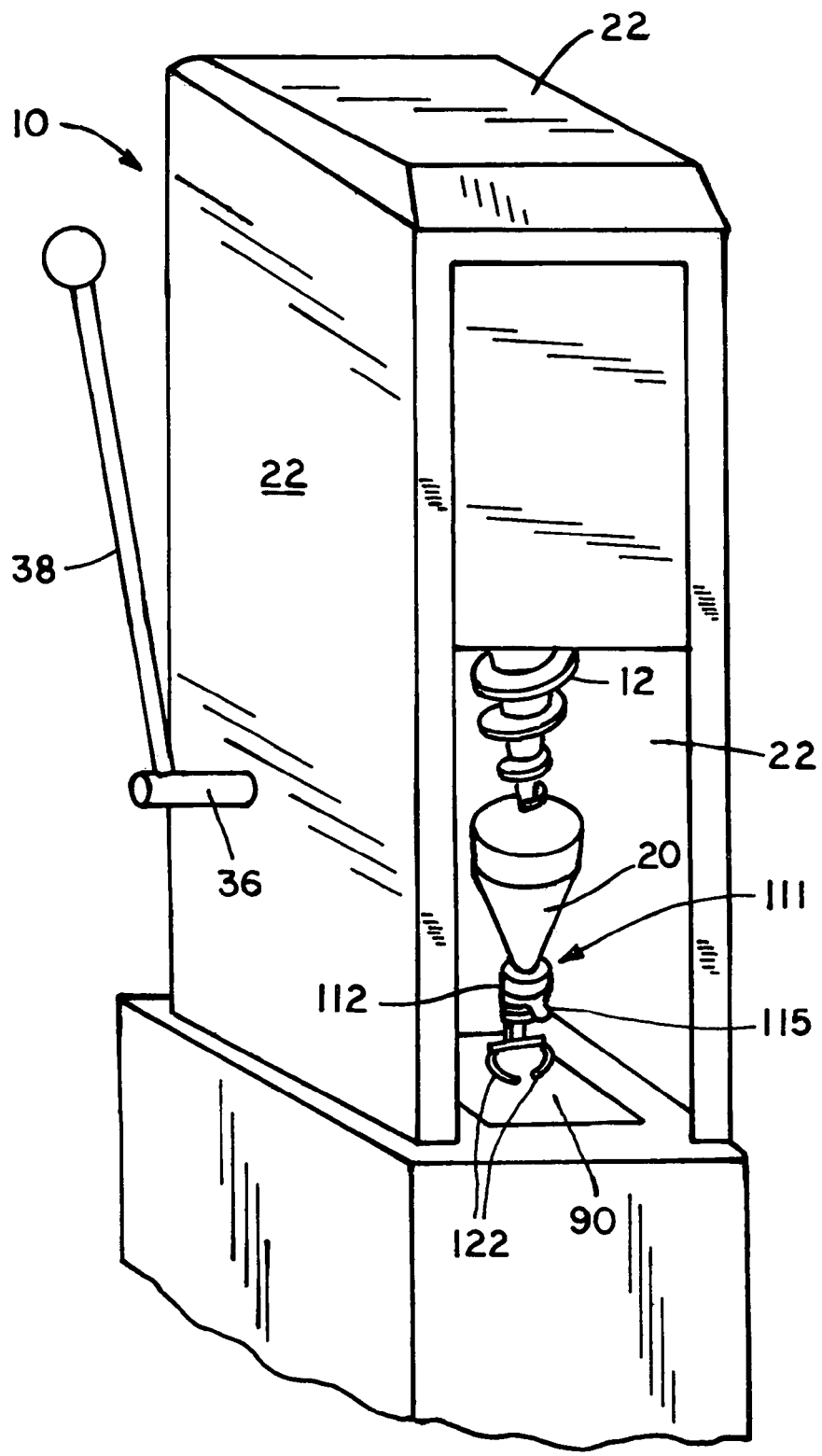

| | | | |
|---|---|---|---|
| 4,708,489 A * | 11/1987 | Carlson | 366/149 |
| 4,740,088 A * | 4/1988 | Kelly, Jr. | 366/138 |
| 4,755,060 A * | 7/1988 | Pedersen | 366/286 |
| 4,822,175 A * | 4/1989 | Barnard et al. | 366/347 |
| 4,828,398 A * | 5/1989 | Verkler | 366/279 |
| 4,974,965 A * | 12/1990 | Heinhold et al. | 366/289 |
| 5,067,819 A * | 11/1991 | Heinhold et al. | 366/138 |
| 6,318,889 B1 * | 11/2001 | Hansen, Sr. | 366/286 |
| 6,341,887 B1 * | 1/2002 | Hansen, Sr. | 366/138 |
| 6,732,771 B2 * | 5/2004 | Gispert Casino et al. | 141/270 |
| 6,848,356 B1 * | 2/2005 | Mueller | 99/455 |
| 2005/0249032 A1 * | 11/2005 | Heinhold et al. | 366/289 |

\* cited by examiner

MACHINE FOR MIXING A FROZEN DESSERT

This application claims the benefit of U.S. Provisional Application No. 60/568,757, filed May 5, 2004.

BACKGROUND OF THE INVENTION

1. Field of the Invention

The present invention relates to machines for mixing a frozen dessert in which various condiments and flavors can be mixed in a given portion of a frozen material such as ice cream to form a smooth, soft frozen delicacy, and wherein milk or other liquids can also, if desired, be mixed with the ice cream to form a conventional semi-liquid milk shake. In particular, the invention relates to improvements in means incorporated with the mixing cone for sealing the top of the mixing cone and closing the lower dispensing port of the mixing cone so that the mixing cone can retain the liquid material such as milk as it is being mixed with the frozen material. Further, the invention relates to means for holding a cup beneath the dispensing port of the mixing cone to hold the cup in a stabile position for dispensing of the mixed product from the dispensing port of the mixing cone.

2. State of the Art

Machines are well known in the prior art for mixing and transforming a hard frozen ice cream product to a substantially soft, smooth, creamy product which is superior in quality to conventional soft ice creams. Such machines are disclosed in our U.S. Pat. Nos. 4,974,965 and 5,067,819, issued Dec. 4, 1990 and Nov. 26, 1991, respectively, in which a variety of condiments such as pieces of candy, fruit, nuts, cookies and other flavors can be rapidly mixed with the ice cream in single serve portions.

As a result of a search of the relevant prior U.S. patents, the following patents were found which relate to similar machines of the type to which the present invention pertains: U.S. Pat. Nos. 2,626,132; 2,626,133; 3,061,279; 4,448,114; 4,506,988; 4,548,508; 4,637,221; 4,647,214; 4,693,611; and 4,708,489.

3. Objectives

A principal objective of the present invention is to provide an improved system for effectively closing the mixing cone when the mixing auger of the frozen dessert mixing machine is positioned within the mixing cone so that a liquid material such as milk, carbonated drinks and fruit juices can be mixed with a frozen material such as ice cream by the mixing auger in the mixing cone without the liquid mixture being ejected from or otherwise escaping from the mixing cone during the mixing of the frozen material and liquid material in the mixing cone.

An additional objective of the present invention is to provide a novel means and mechanism for holding a cup, and in particular a light weight plastic or paper cup, beneath the dispensing port on the mixing cone.

BRIEF DESCRIPTION OF THE INVENTION

The above objectives are achieved in accordance with the present invention by providing novel improvements to the conventional machines for mixing a frozen dessert of the prior art. Because the basic mixing machines are well documented in the prior art, detailed description of the machines will not be repeated in this specification. For purposes of detailed descriptions of the basic mixing machines, the reader is referred to our previous U.S. Pat. Nos. 4,974,965 and 5,067,819 and the other prior art patents listed above.

In accordance with the present invention, an otherwise conventional frozen dessert mixing machine is provided with an improved mixing cone and associated mechanisms for closing and sealing the upper end of the mixing cone as the mixing cone is raised into engagement with the mixing auger. The otherwise open upper end of the mixing cone forms a substantially circular sealing ring that engages a closing plate mounted on the housing from which the mixing auger extends. After the ingredients that are to be mixed are put in the mixing cone, the mixing cone is raised so that the mixing auger enters into the mixing cone through the otherwise open end through which the ingredients have been introduced into the mixing cone. The mixing cone is raised until the upper end of the mixing auger is positioned beneath the sealing ring on the mixing cone. At this position, the sealing ring comes into contact with the closing plate and makes a seal with the closing plate.

The auger is then activated and the ingredients within improved mixing cone are subjected to a very vigorous mixing action. The sealed upper end of the mixing cone prevents liquid components of the ingredients in the mixing cone from being expelled from the upper end of the mixing cone. A valve mechanism is provided at the bottom of the mixing cone, and the valve mechanism is kept closed during the mixing of the materials in the mixing cone. When the materials in the mixing cone have been sufficiently mixed, the valve on the bottom of the mixing cone is opened so that the mixture within the mixing cone is dispensed from the mixing cone.

In a preferred embodiment of the invention, novel means are provided for holding a cup immediately below the dispensing valve on the mixing cone. The means for holding a cup comprises a pair of fingers that are associated with the valve mechanism on the bottom end of the mixing cone. The fingers are adapted to engage an upper end of a cup and in particular the circular torus shaped end provided on conventional paper and plastic cups.

Additional objects and features of the invention will become apparent from the following detailed description, taken together with the accompanying drawings.

THE DRAWINGS

Figure 2:
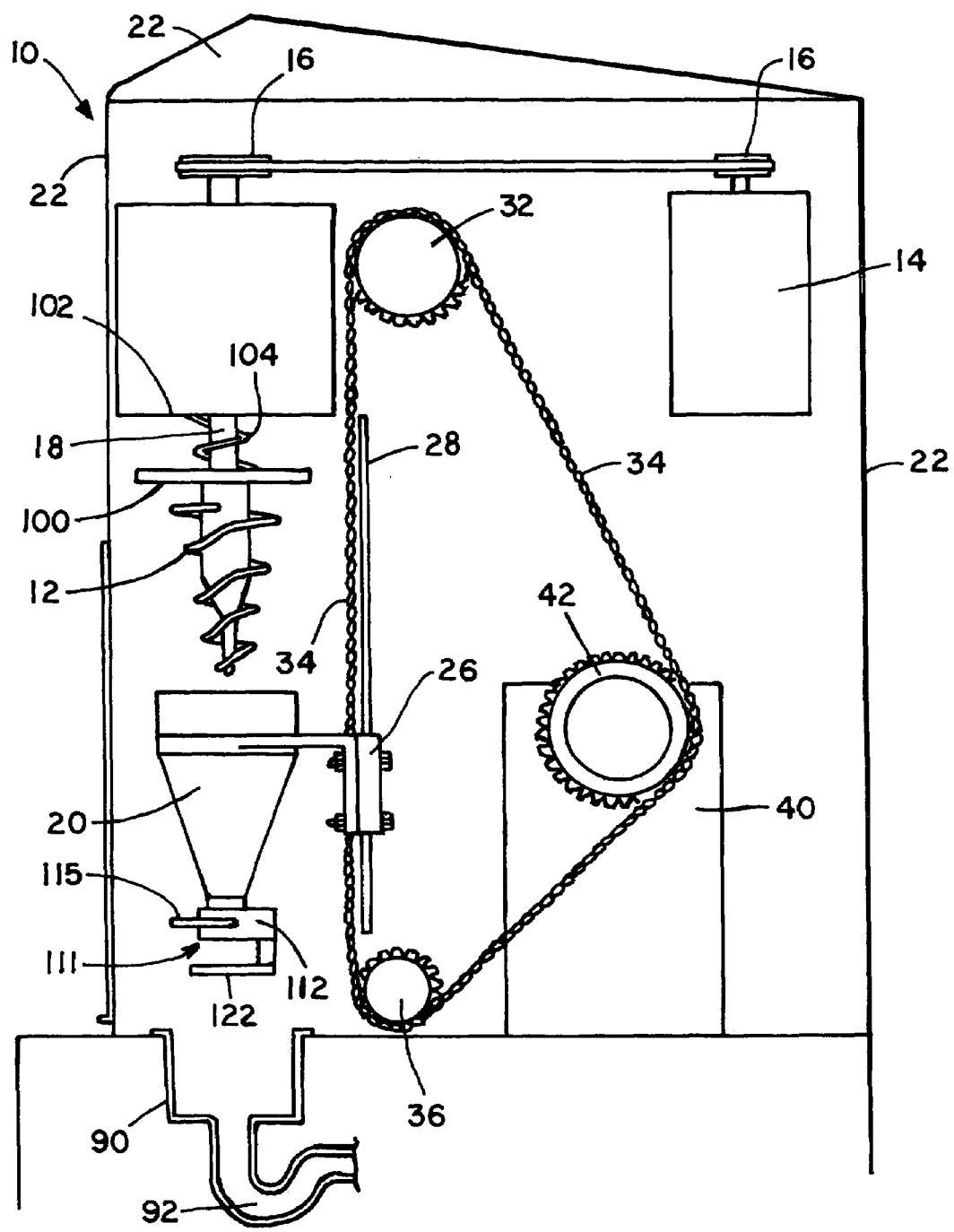
Figure 3:
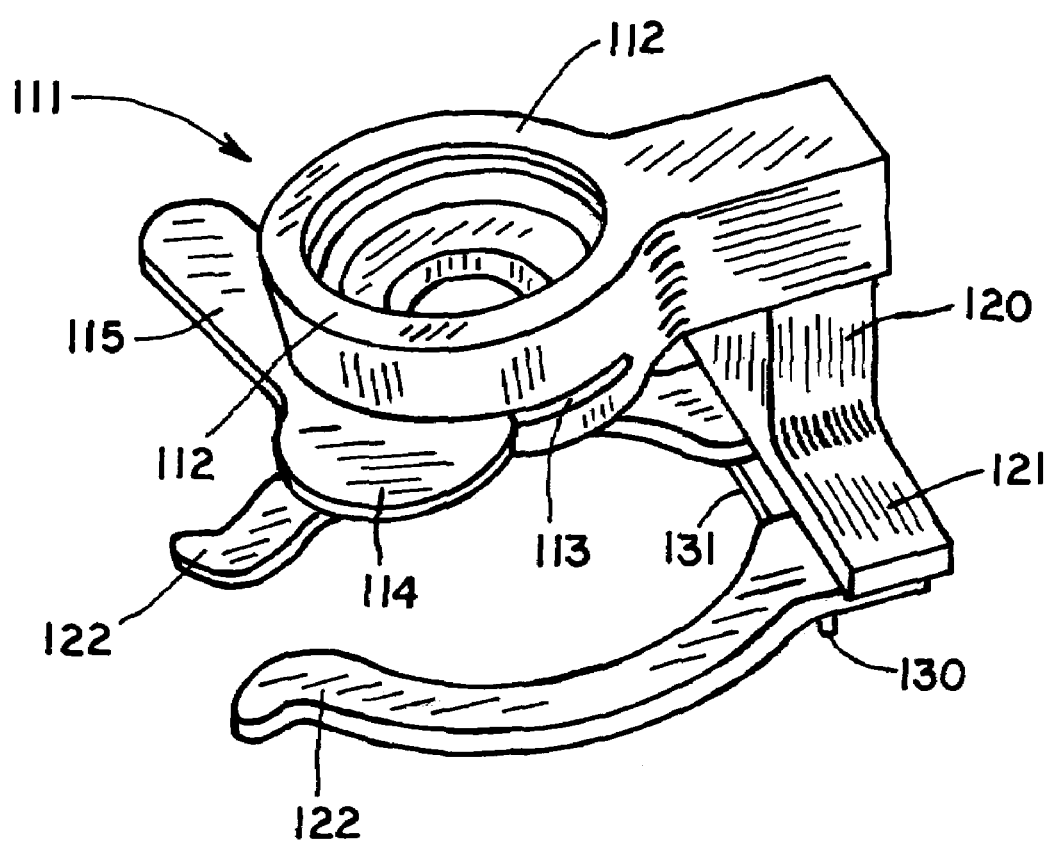

Preferred embodiments of the present invention representing the best modes presently contemplated of carrying out the invention are illustrated in the accompanying drawings in which:

FIG. 1 is a pictorial representation of a mixing machine of the present invention;

FIG. 2 is a side view of a mixing machine similar to that of FIG. 1 with the side of the housing of the mixing machine removed and with the bottom portion shown in section to illustrate working components within the housing; and FIG. 3 is a pictorial view of a nozzle shut off valve mechanism that is attached to the lower end of the mixing cone of the apparatus shown in FIGS. 1 and 2, with the valve mechanism including associated means for holding a cup beneath the shut off valve.

DETAILED DESCRIPTION OF THE ILLUSTRATED EMBODIMENTS

Preferred embodiments of a frozen comestible mixing device 10 in accordance with the present invention are illustrated in the drawings. The apparatus 10 includes a mixing auger 12 and a motor 14, pulley system 16 and drive shaft 18 for driving the auger 12. A mixing cone 20 is provided in coaxial alignment with the mixing auger 12, and a housing 22 is provided for the apparatus. The apparatus, including the auger 12, the motor 14, pulley system 16, drive shaft 18, housing 22 and a mixing cone 20 is conventional and well known in the prior art. The prior art as referred to hereinbefore gives a full and complete description of the general makeup and operation of such mixing apparatus.

Briefly, conventional mixing apparatus of the prior art includes a mixing cone 20 attached to a carriage 26 that travels upwardly and downwardly along a vertical support post. It is conventional to mount the carriage 26 on a rigid, elongate track 28 for linear, reciprocating movement toward and away from the auger 12. The carriage 26 is designed to move along the track 28 with a minimum of frictional resistance. To this end, it is advantageous to provide a track 28 having parallel, spaced side edges which form a race for ball bearings mounted within the carriage 26.

A gear mechanism 40 is provided within the housing 22, with the drive shaft 36 of the gear mechanism 40 extending from the gear mechanism 40 through a side wall of the housing 22. A lever 38 in turn extends from the drive shaft 36 to be positioned adjacent to but spaced slightly from the side of the housing 22 such that the lever can be moved in a pivotal movement about the drive shaft 36. The gear mechanism 40 further has an output drive sprocket 42 which is driven in rotational motion upon pivotal movement of the lever 38.

An upper idler sprocket 32 is positioned above the auger 12 and generally in line with the longitudinal length of the track 28. A drive chain 34 is connected at one end to the carriage 26, with the drive chain 34 extending from the carriage 26 around the upper idler sprocket 32 to the drive sprocket 42 of the gear mechanism 40. The drive chain 34 then extends around the drive sprocket 42 to and around a lower idler sprocket 36 and back to the carriage 26. When the lever 38 of the gear mechanism 40 is moved downwardly in a first pivotal movement, the drive chain 34 moves around the drive sprocket 42 so as to move the carriage 26 and the mixing cone 20 mounted thereon in linear movement toward and away from the auger 12.

In a preferred aspect of the present invention, a sealing mechanism is provided to seal the top of the mixing cone 20 when the mixing cone 20 has been moved toward the auger 12 so that the auger 12 is positioned within the mixing cone 20. This allows liquids such as milk to be introduced into the mixing cone 20 to be mixed with a frozen material such as ice cream to make a conventional, semi-liquid milk shake. The top of the mixing cone 20 must be sealed to prevent liquid and semi-liquid material from being ejected or forced from the top of the mixing cone 20 by the vigorous mixing action of the auger 12.

The sealing means in an preferred embodiment of the present invention comprises a sealing plate 100 that is attached to a gear housing component 102 from which the drive shaft 18 of the auger extends. The sealing plate 100 is substantially circular in shape and has a central opening through which the drive shaft of the auger 12 is received for rotational movement of the drive shaft 18. The central opening in the sealing plate 100 forms a bearing surface through which the drive shaft 18 is allowed to rotate when driving the auger 12 and the sealing plate 100 can simultaneously slide longitudinally along the drive shaft 18. The sealing plate is mounted to the gear housing component 102 through a coil spring 104 that is positioned coaxially about the drive shaft 18. In its most simple implementation, the upper end of the spring 104 is attached as by welding to the housing component 102 and the lower end of the spring 104 is attached as by welding to the sealing plate 100.

The ingredients that are to be mixed into the milk shake or other similar type comestible are placed within the mixing cone 20 and the hand lever 38 is activated so as to raise the mixing cone 20 upwardly. The mixing cone moves upwardly to fully encompass and contain the mixing auger 12, and the otherwise open upper end of the mixing cone 20 which forms a substantially circular seal ring then makes contact with the lower sealing surface of the sealing plate 100. The sealing plate 100 is forced upwardly against the spring 104 to compress the spring 104 and hold the sealing plate in tight sealing engagement with the upper end of the mixing cone 20. Once engagement of the upper end of the mixing cone 20 and the sealing plate 100 has been achieved, the auger can be operated in a high speed mode to vigorously mix and blend the materials in the mixing cone 20.

A shut off valve 111 is provided at the lower end of the mixing cone 20 so that liquid and semi-liquid material cannot exit the mixing cone 20 when the valve 111 is closed. As best shown in FIG. 3, the shut off valve 111 comprises a valve body 112 which has a cylindrical opening extending through the valve body 112 from top to bottom. The top end of the cylindrical opening is conveniently provided with internal threads, and the valve body 112 can be readily attached to the lower end of the mixing cone 20 by screwing the valve body 112 to external threads that are provided on the lower end of the mixing cone 20. A horizontal slot 113 is provided in part of the valve body 112. The slot 113 is located between the upper and lower ends of the valve body 112. A flat sliding valve plate 114 is adapted to slide into and out of the slot 113. The valve plate 114 has an elongate extension 115 that extends from the slot 113, and the valve plate 114 is conveniently attached to the valve body for pivotal movement of the valve plate 114 and the extension 115 about a vertical axis near the point where the extension 115 projects from the slot 113. By sliding the extension 115 to one side, the valve plate 114 is pivoted out of the slot 113 so as to open the cylindrical opening in the valve body 112. Conversely, when the extension is moved back to its initial position extending substantially straight out of the valve body 112, the valve plate is pivoted into the slot 113 so as to close the cylindrical opening in the valve body 112.

A cup holding mechanism is also conveniently incorporated into the shut off valve system. As best shown in FIG. 3, a vertical support 120 extends downwardly from the back side of the shut off valve 111. Two wings 121 extend outwardly from the bottom end of the support 120, with the wings 121 being oriented substantially perpendicular with the support 120. A pair of inwardly curved cup holding extensions 122 extend from the outwardly projecting ends of the respective wings 121. The inwardly curved cup holding extensions 122 are pivotally connected to the respective ends of the wings 121, and a spring mechanism biases the extensions 122 to move toward each other such that the projecting ends of the wings are separated by a space of only one or two inches. The spring mechanism shown in FIG. 3 comprises a downwardly projecting pin 130 extending downwardly from each of the extensions 122, with an elastomeric item such as a rubber band or O-ring 131 attached between the projecting pins 130 to exert a spring force on the extensions 122 to bias the extensions 122 toward each other.

The inwardly curved extensions 122 form a generally circular shaped opening that is spaced relatively close to the bottom of the shut off valve 111. A cup, especially one of the type having a torus lip forming the open end of the cup, can be pushed into the opening between the inwardly curved extensions 122. The spring bias allows the cup to be pushed between the extending ends of the inwardly curved extensions 122. When the cup is completely positioned withing the opening between the inwardly curved extensions 122, the spring bias holds the inwardly curved extensions 122 securely against the wall of the cup and the torus lip on the cup retains the cup on the inwardly curved extensions 122.

A catch basin or sink 90 is advantageously provided immediately below the mixing cone 20 when the mixing cone 20 is in its lowermost position. The sink 90 catches any drippage from the mixing cone 20 during normal use in making frozen desserts. In addition, the sink collects the cleaning and sanitizing solution as it drains from the mixing cone 20 during the cleaning and sanitizing step. The cleaning and sanitizing aspect of the present invention is disclosed and described in U.S. Pat. No. 5,067,819. The sink 90 is advantageously connected through a conventional trap 92 to a drain waste vent system. If a drain waste vent system is not available, the sink 90 could be connected to a collection vessel or tank (not shown) which would then be periodically emptied when necessary.

Although preferred embodiments of the mixing machine of the present invention have been illustrated and described, it is to be understood that the present disclosure is made by way of example and that various other embodiments are possible without departing from the subject matter coming within the scope of the invention.

The invention claimed is:

1. In a frozen dessert mixing machine of the type including (a) a housing, (b) a motor driven drive shaft extending from said housing, (c) an auger attached to a distal end of said motor driven drive shaft, (d) a mixing cone having an open top and an open bottom with said mixing cone being in substantially coaxial alignment with said mixing auger and said motor driven drive shaft, and (e) drive means for moving the mixing cone in linear movement toward said auger, an improvement comprising:

means for effectively closing said open top of said mixing cone when said mixing auger is positioned within said mixing cone so that a liquid material can be mixed with a frozen material in said mixing cone by said auger to produce a liquid mixture without said liquid mixture being ejected from or otherwise escaping from said mixing cone during the mixing of said frozen material and said liquid material in said mixing cone;

a valve mechanism associated with said open bottom of said mixing cone, said valve mechanism being kept closed when said liquid material and said frozen material are introduced into said mixing cone as well as during mixing of said liquid material and said frozen material in said mixing cone, with said valve mechanism then being opened to dispense said liquid mixture from said bottom of said mixing cone; and a cup holding mechanism incorporated into said valve mechanism at the bottom of said mixing cone, said cup holding mechanism being adapted to hold a cup in proper position immediately beneath said valve mechanism so that said liquid mixture dispensed from said mixing cone through said valve mechanism is fed directly into said cup.

2. The improvement in a frozen desert mixing machine in accordance with claim 1, wherein said means for closing said top end of said mixing cone comprises:

a seal plate having an opening through which said motor driven drive shaft extends, with said seal plate being positioned between said housing from which said motor driven drive shaft extends and said auger;

said opening in said seal plate forming a bearing surface through which said motor driven drive shaft can rotate; and means for mounting said seal plate to said housing from which said motor driven drive shaft extends so that said seal plate is maintained in its position between said housing from which said motor driven drive shaft extends and said auger, whereby when said mixing cone moves upwardly around said mixing auger so as to fully encompass and contain said mixing auger, said open top of said mixing cone makes contact with a lower sealing surface of said seal plate.

3. The improvement in a frozen desert mixing machine in accordance with claim 2, wherein said means for mounting said seal plate to said housing from which said motor driven drive shaft extends comprises a coil spring that is positioned coaxially about said motor driven drive shaft with an upper end of said spring being attached to said housing from which said motor driven drive shaft extends and with a lower end of said spring being attached to said seal plate.

4. A frozen dessert mixing machine, comprising:

a housing;

a motor driven drive shaft extending from the housing;

an auger attached to a distal end of the drive shaft;

a mixing cone having an open top and an open bottom, the mixing cone being in substantially coaxial alignment with the mixing auger and the motor driven drive shaft;

drive means for linearly moving the mixing cone and the auger relative to one another;

a seal plate having an opening through which the drive shaft extends, the opening in the seal plate forming a bearing surface through which the drive shaft can rotate, the open top of the mixing cone making contact with a lower sealing surface of the seal plate when the mixing cone moves adjacent the mixing auger, the seal plate being mounted to the housing such that the drive shaft can rotate within the opening while the seal plate moves longitudinally relative to the drive shaft to enable operation of the mixing machine while the seal plate and the mixing cone are moved relative to the auger.

5. The machine of claim 4, further comprising:

a valve mechanism associated with the open bottom of the mixing cone, the valve mechanism being kept closed when the liquid material and the frozen material are introduced into the mixing cone as well as during mixing of the liquid material and the frozen material in the mixing cone, with the valve mechanism then being opened to dispense said liquid mixture from said bottom of said mixing cone.

6. The machine of claim 5, further comprising:

a cup holding mechanism incorporated into the valve mechanism, the cup holding mechanism being adapted to hold a cup in proper position immediately beneath the valve mechanism so that the liquid mixture dispensed from the mixing cone through the valve mechanism is fed directly into the cup.

7. The machine of claim 4, further comprising a coil spring coupling the seal plate to the housing, wherein the drive shaft extends through the coil spring and the opening in the seal plate.

8. A frozen dessert mixing machine, comprising:

a housing;

a drive shaft extending from the housing;

an auger attached to a distal end of the drive shaft;

a mixing cone having an open top and an open bottom, the mixing cone being moveable in linear movement relative to the auger;

a seal plate having an opening through which the drive shaft extends;

the opening in the seal plate forming a bearing surface in which the drive shaft can rotate; and a coil spring coupling the seal plate to the housing, the coil spring allowing the seal plate to move relative to the drive shaft to enable operation of the mixing machine while the seal plate and the mixing cone are cooperatively moved relative to the auger.

9. The machine of claim 8, further comprising:

a valve mechanism associated with the open bottom of the mixing cone, the valve mechanism being kept closed when the liquid material and the frozen material are introduced into the mixing cone as well as during mixing of the liquid material and the frozen material in the mixing cone, with the valve mechanism then being opened to dispense said liquid mixture from said bottom of said mixing cone.

10. The machine of claim 9, further comprising:

a cup holding mechanism incorporated into the valve mechanism, the cup holding mechanism being adapted to hold a cup in proper position immediately beneath the valve mechanism so that the liquid mixture dispensed from the mixing cone through the valve mechanism is fed directly into the cup.

11. A frozen dessert mixing machine, comprising:

a housing;

a drive shaft extending from the housing;

an auger attached to a distal end of the drive shaft;

a mixing cone having an open top and an open bottom, the mixing cone being moveable in linear movement toward the auger;

a seal plate having an opening through which the drive shaft extends; and a valve mechanism, removably coupled to the open bottom of the mixing cone, the valve mechanism being kept closed when the liquid material and the frozen material are introduced into the mixing cone as well as during mixing of said liquid material and said frozen material in the mixing cone, with said valve mechanism then being opened to dispense the liquid mixture from the bottom of the mixing cone; and a cup holding mechanism incorporated into the valve mechanism, the cup holding mechanism being adapted to hold a cup in proper position immediately beneath the valve mechanism so that the liquid mixture dispensed from the mixing cone through the valve mechanism is fed directly into the cup.

12. The machine of claim 11, wherein the valve mechanism is threadably coupled to the open bottom of the mixing cone.

13. The machine of claim 11, wherein the seal plate is coupled to the housing such that the drive shaft can rotate within the opening while the seal plate moves longitudinally relative to the drive shaft to enable operation of the mixing machine while the seal plate and the mixing cone are moved relative to the auger.

14. The machine of claim 13, further comprising a coil spring coupling the seal plate to the housing, wherein the drive shaft extends through the coil spring and through the opening in the seal plate.

* * * * *